(12) United States Patent
Fitzpatrick et al.

(10) Patent No.: US 6,661,561 B2
(45) Date of Patent: Dec. 9, 2003

(54) HIGH FREQUENCY DEFORMABLE MIRROR DEVICE

(75) Inventors: Glen Arthur Fitzpatrick, Edmonton (CA); Daniel Gelbart, Vancouver (CA)

(73) Assignee: Creo Inc., Burnaby (CA)

( * ) Notice: Subject to any disclaimer, the term of this patent is extended or adjusted under 35 U.S.C. 154(b) by 0 days.

(21) Appl. No.: 09/816,751

(22) Filed: Mar. 26, 2001

(65) Prior Publication Data

US 2002/0135857 A1 Sep. 26, 2002

(51) Int. Cl.[7] .................. G02B 26/00; G02B 26/02; G02F 1/29
(52) U.S. Cl. .................. 359/291; 359/298; 359/230
(58) Field of Search ................. 359/222, 224, 359/230, 290, 291, 298

(56) References Cited

U.S. PATENT DOCUMENTS

| | | | |
|---|---|---|---|
| 4,229,732 A | 10/1980 | Hartstein et al. | 340/815.4 |
| 4,441,791 A | 4/1984 | Hornbeck | 359/295 |
| 5,172,262 A | 12/1992 | Hornbeck | 359/223 |
| 5,311,360 A | 5/1994 | Bloom et al. | 359/572 |
| 5,517,359 A | 5/1996 | Gelbart | 359/623 |
| 5,610,757 A | 3/1997 | Ji et al. | 359/295 |
| 5,661,592 A | 8/1997 | Bornstein et al. | 359/291 |
| 5,748,172 A | 5/1998 | Song et al. | 345/111 |
| 5,768,009 A | 6/1998 | Little | 359/293 |
| 5,867,302 A * | 2/1999 | Fleming | 359/291 |
| 5,926,309 A | 7/1999 | Little | 359/293 |
| 5,999,303 A | 12/1999 | Drake | 359/224 |
| 6,025,951 A | 2/2000 | Swart et al. | 359/245 |
| 6,028,689 A * | 2/2000 | Michalicek et al. | 359/224 |
| 6,445,502 B1 * | 9/2002 | Islam et al. | 359/571 |
| 2001/0028756 A1 * | 10/2001 | Flanders et al. | 385/17 |
| 2002/0031305 A1 * | 3/2002 | Ticknor et al. | 385/48 |

OTHER PUBLICATIONS

Bloom, D.M. "The Grating Light Valve: revolutionizing display technology." Proceedings of SPIE, vol. 3013, pp. 165–171.

* cited by examiner

Primary Examiner—Loha Ben
Assistant Examiner—William Choi
(74) Attorney, Agent, or Firm—Oyen Wiggs Green & Mutala

(57) ABSTRACT

In accordance with the present invention, an array of individually addressable micromachined light reflecting ribbons provide a high speed light valve action by employing a method in accordance with which the ribbons flex about their longer axis under the action of an applied electrostatic field. The ribbons are mounted on pedestals such that the resulting micromechanical structures are substantially symmetrical with respect to a plane along their long axis through the centers of the pedestals and normal to the substrate. This micromechanical arrangement ensures a structure with a high natural frequency, thereby allowing high light valve switching speeds. The particular mode of deformation also ensures a robust structure. The method may be applied in either "bright field" or "dark field" (Schlieren) mode. The particular combination of materials employed allows the method to be used in higher incident power applications such as those encountered in the printing industry. The invention uses the fabrication methods developed for grating light valves to build a deformable mirror light valve combining the fabrication and speed advantages of the former with the simplicity of the latter. Since the ribbons flex about their long axes, the amplitude of tip deflection required to produce a given angular light deflection is much smaller than that required by prior art cantilever devices, which flex about their short axes.

17 Claims, 5 Drawing Sheets

HIGH FREQUENCY DEFORMABLE MIRROR DEVICE

CROSS-REFERENCES TO RELATED APPLICATIONS

None

STATEMENT REGARDING FEDERALLY SPONSORED R&D

Not applicable

REFERENCE To MICROFICHE APPENDIX

Not applicable

FIELD OF THE INVENTION

The invention relates to the modulation of light beams and in particular to modulating light using light valves based on deformable mirrors.

BACKGROUND OF THE INVENTION

Light valves, also referred to as spatial light modulators, have found use in many different fields. One particular industrial field in which these devices have made great impact is the printing industry, where they are extensively used with lasers to create lithographic printing plates. Often the lasers are of near-infrared wavelengths.

Light valves, or linear and two dimensional arrays of light valves, are typically employed when a large number of light spots have to be individually modulated. The imagewise exposure of a printing plate is a good example of such an application wherein pixel size and dot resolution are critical parameters. The computer-to-plate technology, in particular, has made great demands upon the performance of these devices in that the limits of optical power handling, switching speed and resolution are all under pressure due to the operational demands of this industry.

Another application field that stands to benefit from this technology is that of optical communications. In this field there is an ever-increasing need for devices that may be used to switch, modulate or process light signals.

One particular subset of light valves is based on the reflection of the incident light from micro-miniature deformable mirrors. Prior art deformable mirror light valves can be generally divided into three types:

a. Cantilever or hinged mirror type light valves which deflect the light when bending or tilting. A well-known example in this category is the DMD technology developed by Texas Instruments.

b. Membrane light valves where a flat membrane is deformed into a concave or spherical mirror, focusing the light.

c. Grating light valves which diffract the light by forming a periodic physical pattern. A well-known example in this category is the Grating Light Valve developed by Silicon Light Machines of Sunnyvale, Calif. This technology is described by Bloom in his paper in Proc. SPIE-Int. Soc. Opt. Eng. (USA) vol.3013 p.165–p.171. This type of technology is also referred to as "cyclic recording systems" in earlier literature.

Considerable effort has been invested internationally in the in the field of silicon microelectromechanical systems (MEMS) and in the improvement of the fabrication and operation of devices of these three types in particular. Great technical achievements have been obtained in this regard and many process steps have been improved to obtain remarkable device yields, but a number of central limitations remain in respect of these devices.

The major disadvantage of the hinged or cantilevered mirror type devices is comparatively slow response time. Typically, response times in these devices are of the order of 10 microseconds. This is due to the low natural frequency of a cantilever mirror and the large deflection required. Typical cantilevers are 10 microns to 5 microns long. This requires the tip to deflect between 1 micron and 5 microns in order to deflect the light about 10 degrees. Such large deflections reduces the response time of the device.

Membrane light valves have the advantage of relatively higher speeds. However, their major disadvantage is difficulty in fabrication, as the membrane is supported around its complete periphery making it difficult to fabricate the cavity under it by micromachining. Micromachining is the most desirable fabrication method for deformable mirror light valves as it uses standard processes that have been developed for the manufacturing of integrated circuits. The difficulty in fabricating a monolithic membrane device of this type hinges on the fact that it requires a multi-step process where micromachining and bonding of a membrane is required. An example of such a membrane device is shown by Hornbeck in U.S. Pat. No. 4,441,791. The device cannot be fabricated out of a single piece of silicon because of the membrane.

Grating light valves are very fast and response times below 100 nanoseconds are attainable. The major disadvantage of the grating light valves is the low optical efficiency inherent to optical diffraction gratings. Grating light valves may be applied using the zero order diffracted beam or the first order diffracted beam. For zero order use, the contrast ratio is poor. For first order use, the optical efficiency is low, as each first order beam contains less than 50% of the energy. This can be improved by a method known as "blazing". In this method the ribbons in a grating light valve are tilted, or the multiple ribbons forming one spot are progressively deflected to an increasing extent. While this can overcome some of the light loss, it still requires multiple ribbons for each light spot. The devices of this nature are based upon the concept embodied by Bloom in U.S. Pat. No. 5,311,360.

BRIEF SUMMARY OF THE INVENTION

In accordance with the present invention, an array of individually addressable micromachined light reflecting ribbons provide a high speed light valve action by employing a method in accordance with which the ribbons flex about their longer axis under the action of an applied electrostatic field. The ribbons are mounted on pedestals such that the resulting micromechanical structures are substantially symmetrical with respect to a plane along their long axis through the centers of the pedestals and normal to the substrate. This micromechanical arrangement ensures a structure with a high natural frequency, thereby allowing high light valve switching speeds. The particular mode of deformation also ensures a robust structure. The method may be applied in either "bright field" or "dark field" (Schlieren) mode. The particular combination of materials employed allows the method to be used in higher incident power applications such as those encountered in the printing industry. It also finds application in optical communications. The invention uses the fabrication methods developed for grating light valves to build a deformable mirror light valve combining the fabrication and speed advantages of the former with the simplicity of the latter. Since the ribbons flex about their long axes, the amplitude of tip deflection required to produce a given angular light deflection is much smaller than that required by prior art cantilever devices, which flex about their short axes.

DETAILED DESCRIPTION OF THE PREFERRED EMBODIMENT

Figure 1A:
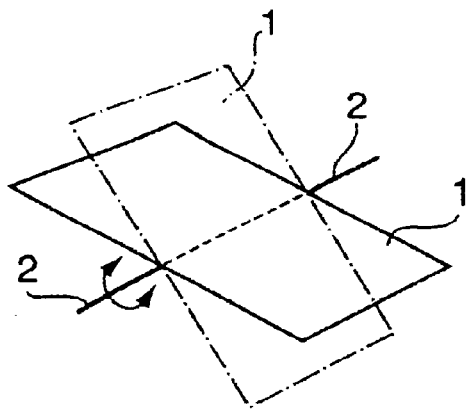
FIG. 1a shows a prior art tilting mirror device
Figure 1B:
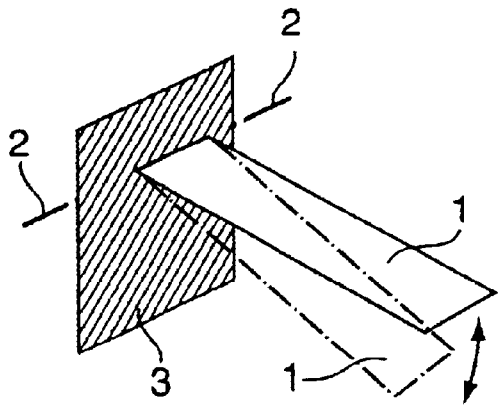
FIG. 1b shows a prior art cantilever ribbon device
Figure 1C:
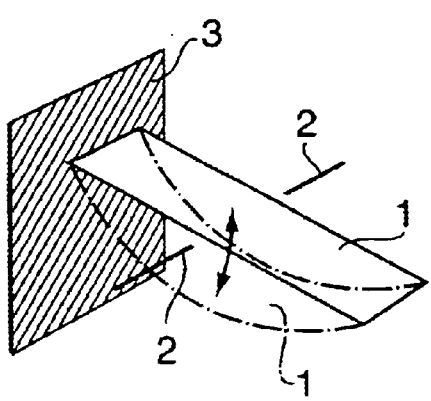
FIG. 1c shows a prior art ribbon device that flexes convex or concave

FIG. 1a, FIG. 1b and FIG. 1c schematically depict three prior art modes of operation of deformable mirror devices of the deflection type. FIG. 1a shows the tilting mirror type of device where the mirror 1 remains essentially rigid while it tilts about axis 2, typically on torsion hinges (not shown). FIG. 1b shows the simple cantilever type of ribbon 1 which characteristically has considerably greater length than width and flexes about an axis 2 parallel to its short side. It is attached at one end to fixture 3. FIG. 1c shows a DMD device that comprises a ribbon 1 that is attached to fixtures 3 at both ends (one end not shown for the sake of clarity). Ribbon 1 flexes concave or convex about axis 2 which, as with the cantilever, is parallel to the short side of ribbon 1.

Figure 1D:
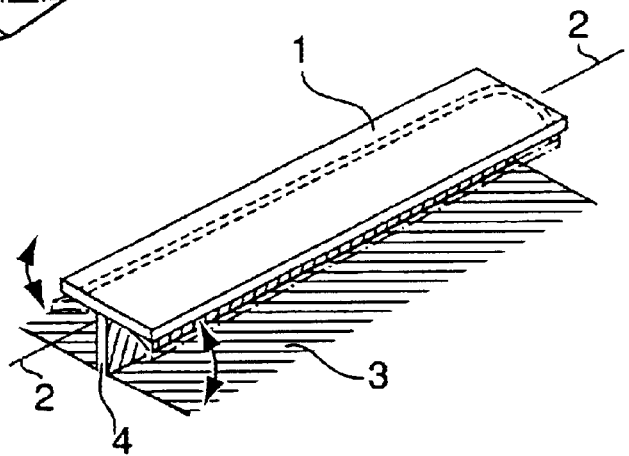
FIG. 1d shows the flexing scheme of the present invention

FIG. 1d schematically shows the present invention, the preferred embodiment of which is given in more detail in the further figures. Ribbon 1, of considerably greater length than width, flexes about axis 2 which is parallel to the long dimension of ribbon 1. Ribbon 1 is attached to fixture 3 by means of pedestal 4.

Figure 2A:
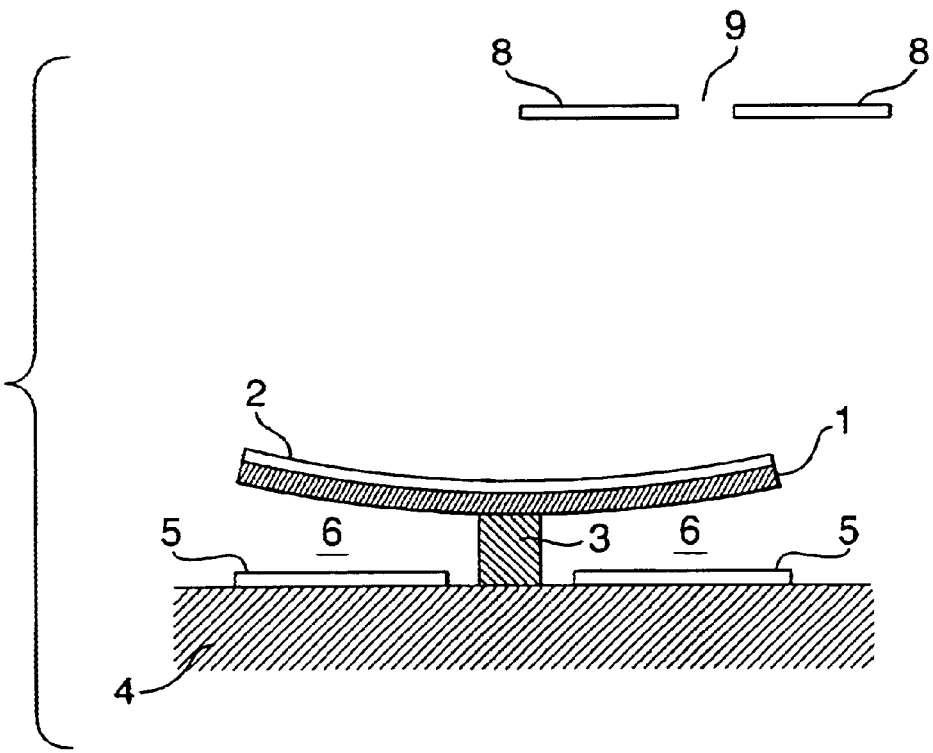
FIG. 2a shows a simplified cross section of the invention in the non-energized state.
Figure 2B:
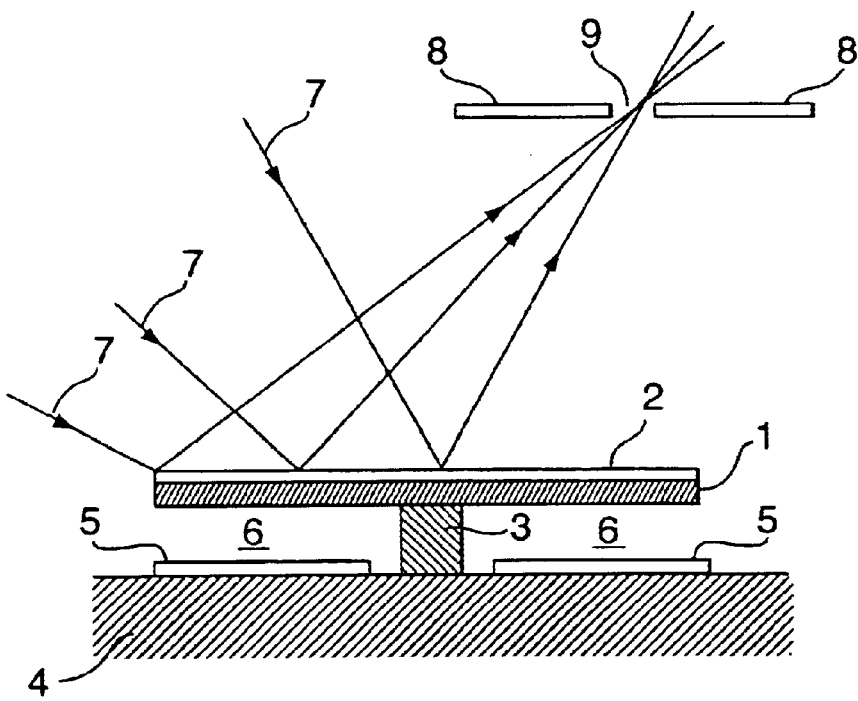
FIG. 2b shows a cross section of the invention in the biased state.
Figure 2C:
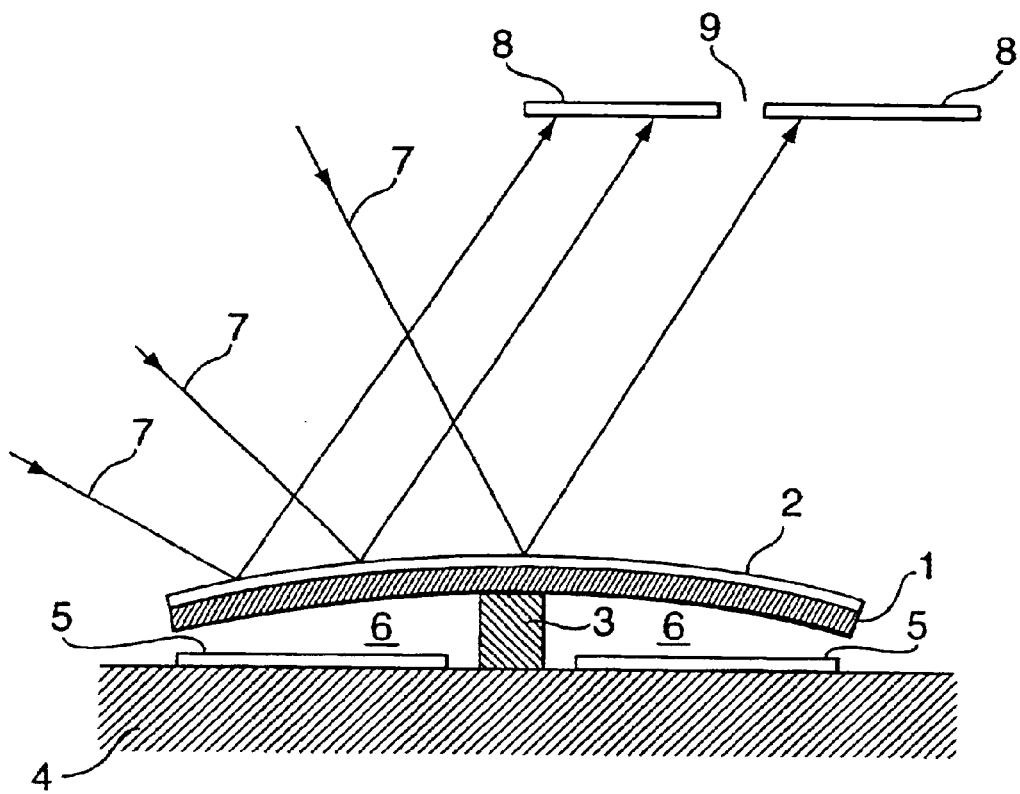
FIG. 2c shows a cross section of the invention in the energized state

FIGS. 2a, 2b and 2c depict the preferred embodiment of the invention. In the general case, the invention extends to a multiplicity of deformable mirror devices that constitute an addressable array. The array may be linear or two-dimensional. For the sake of clarity, we depict in FIGS. 2a, 2b and 2c a single deformable mirror device constituting a single element of such an array fabricated using silicon microelectromechanical systems techniques.

Referring therefore to FIG. 2a, which shows the single deformable mirror device, fabricated as a microelectromechanical device, in its unenergized state, a ribbon 1, referred to in this application for letters patent as a "reflective member", containing reflective layer 2, is deposited on top of pedestal 3. In this application for letters patent, the side of ribbon 1 on which the reflective layer is deposited is referred to as the "reflector surface". Reflective layer 2 is composed of a reflective metal and simultaneously serves as electrode 2. In this preferred embodiment, aluminum is selected for this purpose, but in the general case the metal may be selected to suit the light being reflected. For example, gold may be chosen if the light to be reflected is infrared. It is also possible to employ dielectric reflectors.

In the case of this preferred embodiment electrode 2 and the reflective layer 2 are the same layer. In the general case, the electrode layer and the reflective layers may be separated in order to optimize the reflectivity and electrode operation independently; for example, when dielectric reflectors are used, a separate layer is needed to conduct the electrical current.

Pedestal 3 is fashioned on top of silicon substrate 4. Electrodes 5 are fashioned on top of silicon substrate 4 by standard microelectronic processes. Alternatively, electrodes 5 may be fabricated as simple planar electrodes without any etching. The air space 6 under ribbon 1 is created using a sacrificial layer micromachining process. Sacrificial layer techniques are well established in the microelectronics and microelectromechanical systems (MEMS) fields and will not be detailed herewith. By fashioning ribbon 1 from an insulating material such as silicon nitride, ribbon 1 provides electrical isolation between electrode 2 and electrodes 5. In this application for letters patent we refer to the two sections of ribbon 1 that overhang air spaces 6 as being the "wings" of the microelectromechanical device.

In an alternative embodiment, the near-surface region of silicon substrate 4 may be made conducting, for example by doping, in order to serve as electrode. In such an embodiment, there is no need for the separate deposition of electrodes 5 and all devices in an array would have this electrode as a common electrode, but their electrodes 2 would be independently addressable.

Pedestal 3 supports ribbon 1 along the long axis of the latter, which extends into the plane of the figure by a distance greater than the width of ribbon 1. In this preferred embodiment, ribbon 1 is taken to be rectangular for the sake of clarity, with its long axis extending along the length of the pedestal 3. The two wings of the device are mirror-symmetrical images of each other with the vertical plane through the center of the pedestal 3 forming the mirror plane. This ensures that they will have the same natural frequency.

In the general case of the present invention, the ribbon may be any elongated shape having a long dimension and a short dimension.

In the natural uncharged state of the deformable mirror device, depicted in FIG. 2a, ribbon 1 will tend to be deformed upwards in approximately cylindrical fashion. This kind of deformation is an artifact of the fabrication procedure and is well known to practitioners of the art as being related to built-in stresses in the layers of material from which the device is composed. The extent of this upward deformation may be controlled via the layer deposition process.

In this preferred embodiment electrodes 2 and 5 constitute a capacitor such that application of a voltage between electrodes 2 and 5 establishes an electrostatic field between electrodes 2 and 5. This electrostatic field is attractive and results in a force that acts upon electrode 2. This force pulls the freely extending sections of ribbon 1 into air space 6, thereby causing ribbon 1 to deform about its longer axis. For deformations that are small in comparison to the width of the section of ribbon 1 extending over air space 6, the deformation is essentially cylindrical. For larger deformations, the deformations can be more correctly described by a hyperbolic cosine function. Deformations equal to or greater than those described by hyperbolic cosine function provide particularly good optical contrast. Beyond a certain limit of deformation or voltage, the section of ribbon 1 that extends over air space 6 will in fact "snap down", tilting down until it touches the surface of silicon substrate 4. This is a well-known phenomenon to practitioners in the field of microelectromechanical devices. This "snap down" deformation provides the device with the highest contrast.

One of the major advantages of the present invention is embodied in the fact that the deformation of a flat plane about its longer axis produces a mechanically strong structure with a high natural vibrational frequency, both parameters being greater than when the deformation occurs around the short axis. This difference is even more pronounced if compared with a plane that is cantilevered around its one short edge, which is one of the typical prior art configurations employed in industry at this time.

To address the natural deformation of ribbon 1, as depicted in FIG. 2a, the invention comprises a method that recognizes three states for the device. The first is an unenergized state, depicted in FIG. 2a, in which there is no charge applied to the capacitor between electrodes 5 and 2. In this state ribbon 1 is deformed slightly upwards. No light is allowed to exit the combination of elements depicted in FIG. 2a when the ribbons are in this state. This may be achieved by turning off the light source or by shuttering the light exiting the combination of elements. The role of stop 8 with aperture 9 will be described with reference to FIG. 2b.

FIG. 2b depicts the second state. This is the bias state in which a voltage is applied between electrodes 5 and 2 in order to create enough attractive force between electrodes 2 and 5 to render ribbon 1 planar. Incident light beam 7 is reflected by reflective layer 2. Using an optical element (not shown), the incident light beam is focused such that, when ribbon 1 is in the bias state and therefore flat, the beam will be focused on aperture 9 in stop 8. Stop 8 is a barrier that is not light transmissive. In this case, the light from light beam 7 will be brought into focus on aperture 9. As a result, the majority of light from beam 7 will be passed through aperture 9 in this state.

The third state, depicted in FIG. 2c, is the energized state in which a larger voltage is applied between electrodes 5 and 2 with the result that the ribbon deforms in convex fashion with respect to light beam 7 and the light from light beam 7 is diverged when it is reflected by reflective layer 2. No real image is formed and very little, if any, light from light beam 7 is transmitted through aperture 9.

It is obvious to those skilled in the art that, if stop 8 were replaced by a stop with the same planar dimensions as aperture 9, the resulting arrangement would also function as a light switch. In this embodiment, most of the light will pass beyond the stop in the case of the energized state depicted in FIG. 2c. This mode of operation is sometimes referred to as "darkfield" (or Schlieren), in contrast to the earlier method described above, which is known as "brighffield". With this arrangement, the bias mode will cause most of the light to be stopped. The parity of the light valve action is therefore inverted from the "brighffield" case. In the "brightfield" case, the energized state of the ribbon produces light at the output of the arrangement while, in the "brighffield" case, the light is produced at the output of the arrangement when the ribbon is in the bias state.

It will be understood by those skilled in the art of optics that apertures and lenses may be combined into single lenses that achieve the same aim with respect to the present invention as a combination of an individual lens and individual aperture. This pertains in particular to the focusing of the light beam 7 and the placement of stop 8 with aperture 9 as depicted in FIG. 2a, FIG. 2b and FIG. 2c.

The main advantage of this method of using a deflected mirror responsive to an electric charge is that very small deflections, typically below one micron, are sufficient for effective operation. Making aperture 9 wider gives more light transmission in this "on" state but lowers contrast with the "off" state due to increased light leakage. A good value is to make aperture 9 comparable to the diffraction limit of the mirror formed by the deformed ribbon 1 and its reflective layer 2. To achieve optimal contrast, the deflection needs to be greater than a quarter wavelength. This may be easily achieved even at the near-infrared wavelengths with lasers typically employed in the printing industry and with carbon dioxide lasers operating at 10.6 microns wavelength.

The details of fabrication are disclosed in U.S. Pat. Nos. 5,311,360 and 5,661,592. They are identical to the steps used in fabricating grating light valves and need not be detailed here. With a ribbon length of 200 micron and width of 50 micron a device deflecting by 300 nanometers may be fabricated, switching in less than one microsecond with a voltage of between 20 V and 80V (typically 50V). The upward deformation in the absence of a voltage is of the order of 50 nanometers. The monolithic fabrication approach allows not only the light valve but also the electronic drivers to be fabricated on the same substrate.

Silicon nitride may be used instead of silicon for the ribbon material to give a faster response time (due to higher resonant frequency), higher power handling capability (due to lower coefficient of thermal expansion and very high temperature resistance), and longer life. The natural frequency of the device is a matter of design and may be determined by a choice of dimensions, including the thickness and span of the ribbon, and the materials employed, including their particular properties such as deposition-induced stress.

Figure 3:
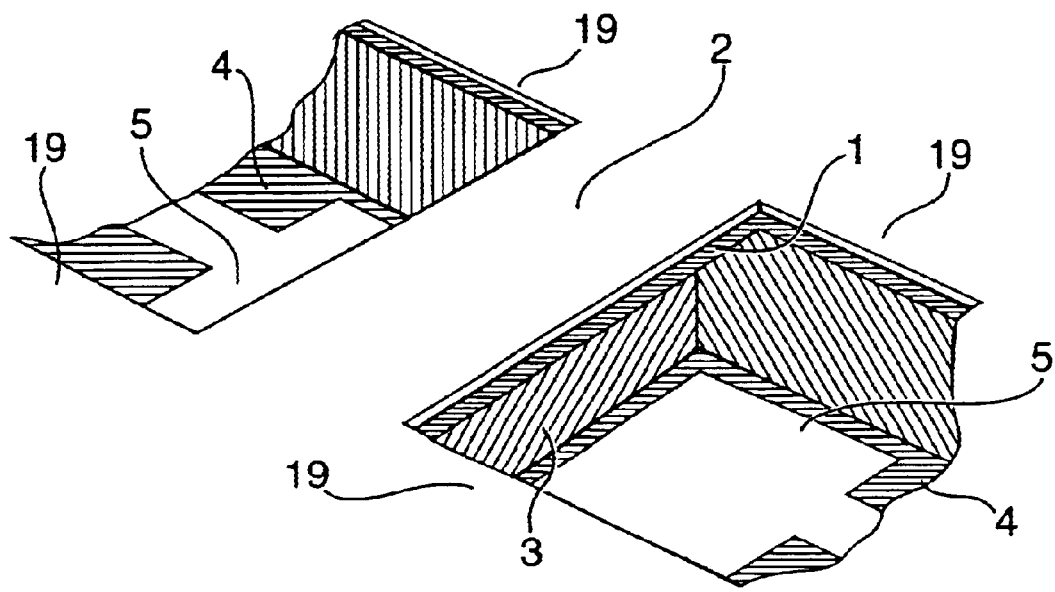
FIG. 3 shows an alternative embodiment of the invention with anchored ribbons

In a further implementation depicted in FIG. 3, and numbered as in FIG. 2 with stop 8 not shown for the sake of clarity, ribbon 1 is attached to a frame 19 at either long end in order to physically strengthen the device, and to further dampen other lower frequency natural flexing modes. While this totally dampens the desired mode of flexing of ribbon 1 near the attached ends, it does leave the central portion of the ribbon free to function as described above. Only a small section of ribbon 1 is required to flex in order to obtain useful light valve action as described above, as only the flexing section will be illuminated under such circumstances. By attaching the ends of the ribbon in this fashion, it also becomes very easy to fabricate the metal connectors that provide the voltage to the reflective layer 2. In this application for letters patent we refer to these attached ends as the "axial ends" of the ribbon to differentiate them from the free-moving flexing perimeters.

As the section of the reflective layer immediately above the pedestal does not deflect as much as the free wings extending over air space 6, reflection from this area does not contribute to the contrast of the light valve action as it remains reflective under in all three modes depicted in FIG. 2a, FIG. 2b and FIG. 2c. The relative extent of this region of lesser deflection of ribbon 1 is adjustable by design. In the general case we refer to it in this application for letters patent as the "lesser-deflecting fraction" of ribbon 1 to the extent that it is a fraction of the whole of the area of ribbon 1. It is entirely designable through a choice of dimensions, materials and voltages determined by the degree of contrast that is desired from the device.

Figure 4:
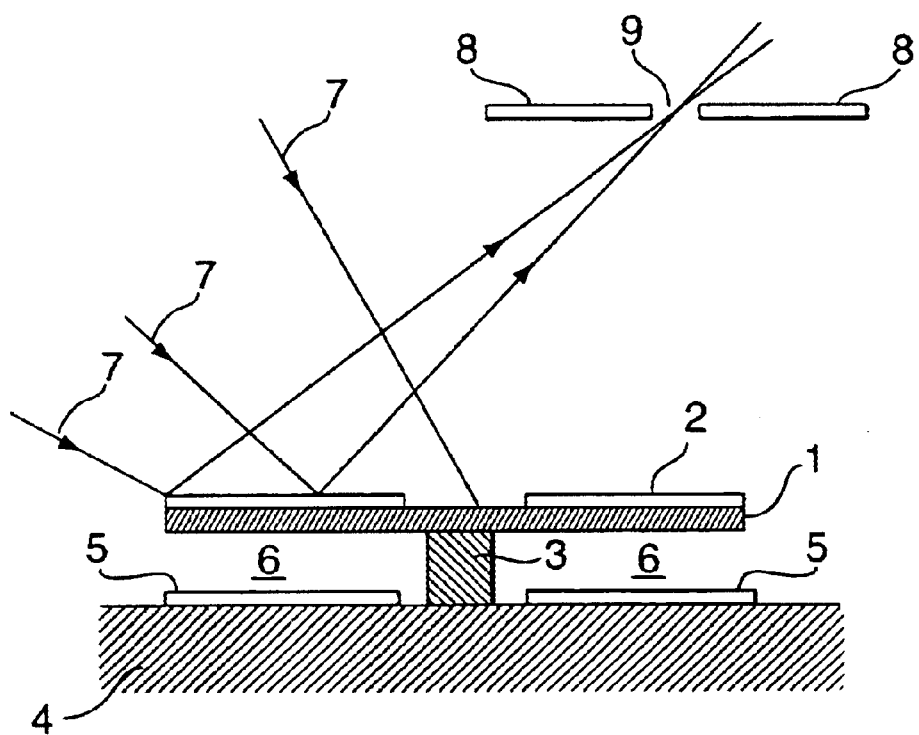
FIG. 4 shows an alternative embodiment of the invention with two mirrors per pedestal.

In an alternative embodiment, depicted in FIG. 4 using the same numbering as in FIG. 2 and FIG. 3, the "lesser-deflecting fraction" of ribbon 1 is not provided with a reflective layer 2 and instead is made absorbing to the beam of light. That part of light beam 7 that impinges on this particular region of ribbon 1 is now absorbed and does not contribute to the reflected signal and the contrast of the light valve action is improved. The drawback of this method is a lower power-handling limit as more light is absorbed in the light valve. In this application for letters patent we refer to the reflective part(s) of the reflector surface as the "reflective segment" of the of the reflector surface.

In yet a further embodiment, two deformable mirror devices are fabricated for every pedestal, thereby having the same physical structure as shown in FIG. 4. This is achieved by fashioning independent separate reflective layers 2 on each of the two wings of ribbon 1. These reflective layers 2, which also function as electrodes 2, are then separately addressed to provide independent light switches. This embodiment has the advantage of both high contrast and higher array density.

The aforementioned embodiments of the present invention all employed electrostatic force between the electrodes to induce the flexing in the wings of the devices. The same flexing may also be obtained by applying a magnetic force. In such an alternative embodiment, the force may be exacted by having microlithographically defined current carrying coils on the ribbons, and deflecting them by placing the device in a magnetic field and changing the current through the microlithographic coils.

The present invention is particularly useful in two areas: laser imaging, particularly with near IR high power lasers, and projection displays. By way of example, a system using the invention for laser imaging is detailed in FIG. 5. A linear array 1 of ribbons is monolithically fabricated on a silicon substrate 4. Each energized ribbon takes the form of a mirror operating by the principles outlined with respect to FIG. 2a, FIG. 2b and FIG. 2c.

A laser 11 is generating a line illumination 7 using an anamorphic beam expander comprised of cylindrical lenses 12 and 13 and focusing lens 18 brings this illumination into focus on the aperture 9 in stop 8. It is clear to those skilled in the art that many other methods can be used to generate the line illumination and to provide it with the appropriate focus. The combination of elements employed serve to take the laser beam and spread it laterally in one dimension (the horizontal in FIG. 5) into a line of illumination. This line is re-converged for further transmission and is then focused using a lens. Any combination of optical elements, separately or integrated, that perform these three functions may be employed.

A particularly useful method for illumination is disclosed by Gelbart in U.S. Pat. No. 5,517,359. Aperture 9 in stop 8 allows the light from the ribbons in the bias state, which have flat reflective surfaces, to pass while blocking most of the light from the energized ribbons by the mechanism described with respect to FIG. 2b and FIG. 2c. Lens 14 forms an image 17 of linear array 1 on the light sensitive material 15, mounted on drum 16. Only the flat ribbons in the bias state create a mark as the light reflected from energized ribbons is blocked by stop 8. All other details of such imaging systems, such as creating a two-dimensional scan and data synchronization are well known in the art of image recording and are not provided here.

Figure 5:
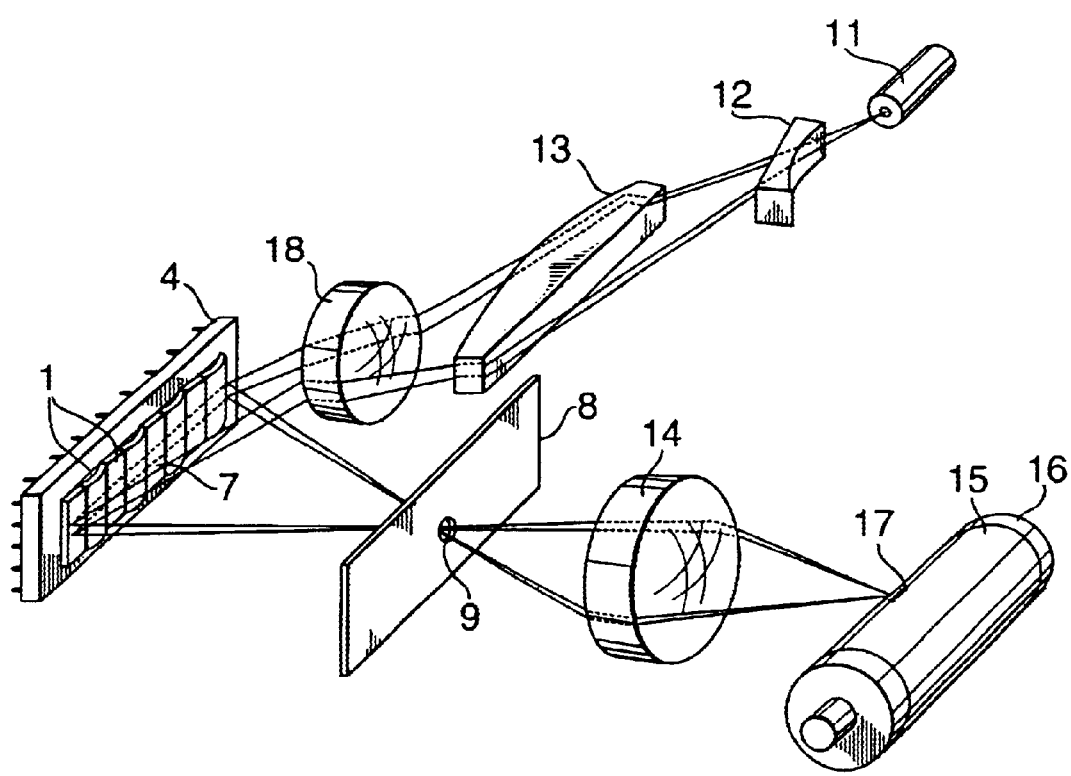
FIG. 5 shows the application of the invention in a laser imaging system

Again it is clear to those skilled in the art that the same application may also operate in "darkfield" mode wherein the aperture 9 in stop 8 is replaced by a stop with the same planar dimensions as aperture 9. In such an embodiment the light reflected by ribbons 1 in the biased (flat) state will be stopped, while light reflected from energized ribbons 1 will be collected by lens 14 and focused to a mark 17 on sensitive material 15, mounted on drum 16. Furthermore, it will be understood by those skilled in the art of optics that apertures and assemblages of lenses may be combined into single lenses that achieve the same aim with respect to the present invention as a combination of individual lenses and individual apertures. This pertains in particular to the focusing of the light beam 7 by means of lenses 12, 13 and 18, and the placement of stop 8 with aperture 9 and lens 14 as depicted in FIG. 5. Aperture 9 can be circular or elongated in order to achieve the best trade-off between light throughput and contrast.

While the embodiments described above focus on the implementation of the invention as a light valve with on and off positions for reflected light, it is clear that he invention may also be employed in situations where there are more states. This may be achieved at two levels of implementation. Firstly, with reference to any of FIG. 2b, FIG. 2c, FIG. 4 and FIG. 5, the intensity of light reflected through aperture 9 in the brightfield implementations my be controlled by controlling either the degree of deflection of individual ribbons or, additionally, by controlling the number of ribbons in an array that reflect light through the aperture 9 at any one time. This allows analog light signals to be created from a constant incident beam by applying modulating voltage signals between the electrodes 2 and 5 in FIG. 2b, FIG. 2c, FIG. 3 or FIG. 4.

The invention may also be employed to address a well-known problem in the field of optical applications. The cross-sectional intensity of beams from light sources, including lasers, typically varies, with there usually being greater intensity near the middle of the beam. Many applications require the beam to have an intensity profile that is as square as possible. By illuminating an array embodying the present invention with, for example, a laser beam, the amount of reflected light form each ribbon may be adjusted such that the beam profile is transformed. In a simple case the ribbons reflecting the near-edge regions of the beam are deflected such as to reflect more light through aperture 9, while the ribbons reflecting the near-center region of the beam are deflecting to reflect relatively less.

Although the invention is described as a collection of specific embodiments, it is understood that alterations and modifications of this invention will become apparent to those skilled in the art. It is therefore intended that the following claims be interpreted as covering all such alterations and modifications as fall within the true spirit and scope of the invention.

What is claimed is:

1. A method for modulating light using a microelectromechanical structure, said microelectromechanical structure comprising a plurality of thin flexible reflective members, said reflective members having elongated shapes, said elongated shapes having a long dimension and a short dimension, said reflective members having at least one reflector surface, said reflector surface having one or more reflective segments and said reflective members capable of being flexed independently of one another, said method comprising directing a beam of light to reflect from said reflective members and flexing a part of said reflective members about an axis parallel to said long dimension to vary a curvature of at least one of the reflective segments, wherein each of said reflective members is affixed to the rest of said microelectromechanical structure along a line parallel to said long dimension and along a pedestal extending along said long dimension and each of said reflective members projects to either side of the pedestal and wherein said flexing is induced by application of one of the following forces to said reflective members: electrostatic, magnetic.

2. A deformable mirror device capable of selectively reflecting and modulating an incident beam of light, the device comprising a microelectromechanical structure having a plurality of thin flexible reflective members, each reflective member having an elongated shape with a long dimension and a short dimension and at least one reflector surface having one or more reflective segments, the one or more reflective segments comprising a reflective layer on the reflective member;

each reflective member being disposed to flex over part of the reflector surface about an axis parallel to said long dimension;

wherein said reflective members are capable of being flexed independently from one another and wherein said reflective members are so positioned relative to an aperture that there exists a particular degree of flexure of any one of said reflective members for which the major fraction of said beam of light reflecting from said one reflective member passes through said aperture.

3. A deformable element for modulating light comprising:

a resilient flexible elongated member having a mirror surface, the member mounted to a substrate and disposed to flex about an axis, wherein a length of the member in a direction parallel to the axis is greater than a width of the member in a direction perpendicular to the axis, and wherein the member is supported on a pedestal and comprises wings projecting to either side of the pedestal and the mirror surface is on a side of the member away from the pedestal.

4. The deformable element of claim 3 wherein the pedestal is elongated and extends parallel to the axis.

5. The deformable element of claim 4 wherein the wings project symmetrically on either side of the pedestal.

6. The deformable element of claim 4 wherein the substrate comprises a silicon substrate and the pedestal and member are micromachined on the silicon substrate.

7. The deformable element of claim 3 wherein the wings are sufficiently wide and flexible to snap down to touch the substrate.

8. A deformable element according to claim 7 comprising electromagnetic means for flexing the member about the axis.

9. The deformable element of claim 3 wherein the wings are each capable of being flexed independently.

10. The deformable element of claim 3 wherein the mirror surface comprises a layer of a metal on the member.

11. The deformable element of claim 10 wherein the layer comprises at least one reflective layer composed of at least one of: gold, palladium, platinum, chromium, aluminum, tantalum, and titanium.

12. The deformable element of claim 10 wherein the layer is in electrical contact with a source of a control voltage.

13. A method for modulating light comprising:

providing a light modulator which comprises a plurality of deformable elements as claimed in claim 3, directing a beam of light to reflect from the mirror surfaces of the resilient flexible elongated members; and, flexing one or more of said members about its axis.

14. The method of claim 13 wherein flexing one or more of the members comprises flexing the one or more of the members sufficiently that the one or more of the members has a substantially hyperbolic cosine shape in cross section.

15. The method of claim 13 wherein flexing one or more of the members comprises flexing the one or more of the members sufficiently that edges of the one or more of the members snap down into contact with the substrate.

16. A light modulator comprising an array of deformable elements, each element comprising:

a resilient flexible elongated member having a mirror surface, the member mounted to a substrate and disposed to flex about an axis, wherein a length of the member in a direction parallel to the axis is greater than a width of the member in a direction perpendicular to the axis, and wherein the members of the deformable elements are so positioned relative to an aperture that there exists a particular degree of flexure of any one of the members for which a major fraction of an incident beam of light reflecting from the one of the members passes through the aperture.

17. A light modulator comprising an array of deformable elements, each element comprising:

a resilient flexible elongated member having a mirror surface, the member mounted to a substrate and disposed to flex about an axis, wherein a length of the member in a direction parallel to the axis is greater than a width of the member in a direction perpendicular to the axis, and wherein the members of the deformable elements are so positioned relative to a beam stop that there exists a particular degree of flexure of any one of the members for which a major fraction of an incident beam of light reflecting from the one of the members is blocked by the beam stop.

* * * * *